Nov. 2, 1965     R. W. PIDD ETAL     3,215,868
THERMIONIC CONVERTER
Filed Oct. 20, 1961
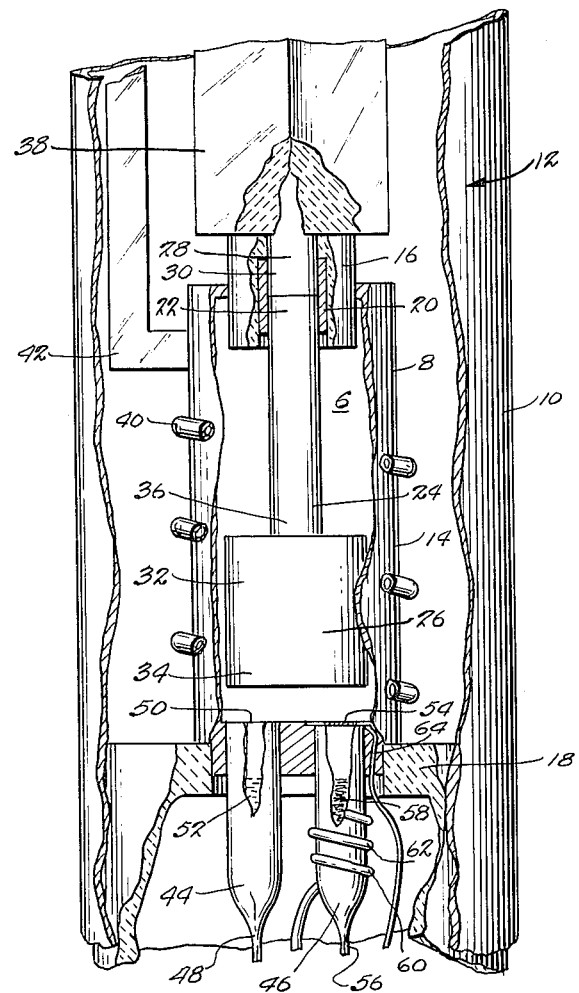
Inventors
ROBERT W. PIDD
ROLLAND A. MISSMAN, JR.
By Sones, Anderson, Luedeka & Nitch
Attys

United States Patent Office

3,215,868
Patented Nov. 2, 1965

3,215,868
THERMIONIC CONVERTER
Robert W. Pidd and Rolland A. Missman, Jr., San Diego,
Calif., assignors to General Dynamics Corporation,
New York, N.Y., a corporation of Delaware
Filed Oct. 20, 1961, Ser. No. 146,657
8 Claims. (Cl. 310—4)

The present invention generally relates to high temperature-low pressure conversion systems and more particularly relates to thermionic convertors and the like.

Thermionic convertors, that is, heat-to-electric energy convertors, are also referred to as plasma cells, etc. They are of particular interest with respect to direct energy conversion applications for atomic reactors for electric power plants, for use in solar generators, etc. Through the use of such thermionic convertors it is possible to directly convert solar energy into electricity. It is also possible to convert the high heat of an atomic reactor generated by nuclear fissioning directly into electricity without necessitating the use of conventional steam generation equipment, such as steam boilers, steam turbines, etc. Accordingly, it is possible to construct electric power plants operating with atomic reactors in a more compact, more simple manner at a relatively low cost.

Thermionic convertors usually are in the form of sealed cells, which include a vapor of an easily ionizable material, such as cesium. The cells also include a hot electrode or cathode, that is, an electron emitter, usually operating at temperatures between about 1000 and about 2000° C., and a cold electrode, anode or collector spaced from the cathode and operating at a lower temperature, for example, from about 0° C. to about 1000° C. Operating temperatures outside the indicated ranges are also possible.

A sealed vapor-tight envelope is provided so that the space between the cathode and the anode can be maintained under relatively low pressure. In a typical thermionic convertor at operating temperature, cesium or other easily ionizable gas is present in such space as a vapor under a pressure of only from about $10^{-6}$ mm. Hg to about 1 mm. Hg.

In operation, the hot electrode or cathode is heated to a temperature which causes electrons to boil off of its hot surfaces into the indicated low pressure space. The electrons pass to the cold electrode. Leads are connected to each electrode, which leads serve to connect the electrode to an external load. Thus, part of the heat of the hot electrode is converted into electric current. The cesium vapor may have the effect of increasing the rate at which the electrons boil off of the hot electrode surface and also reduces the energy loss at the cold electrode. Moreover, it also forms an ionized gas or plasma which neutralizes the electron space charge in the region between the hot electrode and cold electrode, thereby allowing the electrons to pass more readily through such region from the hot electrode to the cold electrode.

Electrons may be considered to be driven out of the cathode interior into the vapor-filled gap between the cathode and anode over a cathode work function barrier, as a result of an expenditure of thermal energy in the cathode. Accordingly, such electrons are lifted to a higher level of electric potential energy. The electrons traverse the gap between the cathode and anode surfaces in this state of higher potential energy and then enter the anode body. In so doing, such electrons descend through a potential difference, the work function of the anode. In so descending, energy is lost which appears in the form of anode heating and is not recoverable.

The potential difference existing between the potential level of the cathode and that of the anode, however, is available for application to an external load and the electrons in descending through the load voltage perform useful external work which is the generator output.

Energy must be expended to lift the electrons to the potential level of the anode surface. Thus, electrons must be lifted to a potential level which is the sum of the load voltage plus the anode work function. However, of the total energy expended for this purpose, only the load voltage may be recovered and that corresponding to the anode work function must be discarded as waste heat.

In the present day thermionic convertors, the value of the anode work function is about 1.8 volts, characteristic of a cesium-coated metallic surface. Cesium exists on the anode surface because of the presence of the cesium vapor at a very low pressure in the gap between the cathode and anode in the cell. When a conventional thermionic convertor is operated at about optimum conditions, an output voltage of up to about 1.5 volts is observed to be delivered into a matched load. Accordingly, the maximum potential level of the electrons is limited to the sum of the output voltage, that is, 1.5 volts, and the anode work function, 1.8 volts, for a total of 3.3 volts. However, only 1.5 volts appear at the load and are useful. The maximum efficiency of the thermionic convertor is equal to the output over the input, i.e., about 1.5 over about 3.3 or about 45.5 percent efficient. This is considered the maximum efficiency of present day thermionic convertors. In addition, there may be and usually are other losses of energy in the system. However, under the conditions given such efficiency could not be exceeded.

However, it would be highly desirable to increase the maximum efficiency of a thermionic convertor so that a greater proportion of the total input could be converted to useful energy. If a reduction in the anode work function could be obtained the overall efficiency of the thermionic convertor could be increased.

There has now been discovered a novel means of substantially reducing the anode work function in a thermionic generator and thereby increasing the efficiency of the generator. Moreover, the anode work function can be controlled during the actual operation of the generator. This latter feature is extremely important in that an anode work function which is extremely low is generally undesirable since an anode current or a back current could be generated and that current could be of substantial size. Accordingly, it is desirable to provide an anode work function sufficiently high so that the anode current is minimal. However, the anode work function should be sufficiently low so that the overall efficiency of the thermionic generator is substantially increased.

In accordance with the present invention, control over the anode work function has been established so that the maximum efficiency can be obtained from the thermionic generator while maintaining a low anode or back current in the generator.

Accordingly, the principal object of the present invention is to provide an improved means for high temperature-low pressure conversion systems. It is a further object of the present invention to provide a thermionic convertor which has improved efficiency. It is also an object of the present invention to provide an improved thermionic generator which has means for controlling during operation of the generator at high temperatures the anode work function and, therefore, the efficiency of the generator. It is a still further object of the present invention to provide an improved thermionic convertor for use in an atomic reactor. It is also an object of the present invention to provide a method of making a thermionic convertor having increased efficiency. It is a still further object of the present invention to provide an improved thermionic convertor which has a reduced anode work function, minimal back current from the anode, and increased maximum efficiency. Further objects and advantages of the present invention are set forth in the following detailed description and in the accompanying drawings of which:

The single figure is a schematic perspective view of a portion of a thermionic convertor in accordance with the present invention, in place in a fuel element for an atomic reactor, portions of the convertor being broken away to illustrate the internal structure thereof.

The present invention generally comprises a new high temperature-low pressure conversion system utilizing means which reduce the anode work function of the convertor, thereby increasing the convertor efficiency. More particularly, the convertor employs means whereby the work function of the anode surface can be controlled during operation of the convertor. In this connection, means are provided for controlling the concentration of gas which affects the anode work function of the convertor. During operation of the convertor, the concentration of gas within the convertor can be regulated in a simple and effective manner. More particularly, a barrier is provided between the low pressure envelope containing the cathode and anode and a reservoir for the anode work function-lowering gas comprising hydrogen, which barrier is permeable to that gas, but impermeable to cesium vapor and the like. The concentration of the work function-reducing gas in the reservoir can be controlled, so that the concentration of that gas within the sealed envelope beyond the barrier and particularly the concentration of the gas between the cathode and anode can be regulated.

Now referring more particulary to the single figure of the accompanying drawings, a thermionic convertor 6 is illustrated, which convertor includes a gas-tight envelope 8 spaced inwardly from the wall 10 of a generally cylindrical tube. The tube 12 may be constructed from any material which can withstand the environment of a nuclear reactor core, such as aluminum. In operation, the tube 12 is inserted in a nuclear reactor core in place of a conventional fuel element. The gas tight envelope 8 is formed of a generally hollow cylindrical anode 14, cold electrode or collector which may be formed of any suitable electrically conductive high temperature material, such as nickel or copper. An electrically insulating component 16 is joined to the anode at the top thereof, and a bottom insulating component 18 abuts the cladding of the fuel element, as illustrated, and supports the remainder of the thermionic converter 6. The electrically insulating components 16 and 18 may comprise, for example, suitable high temperature ceramic material, such as alumina, beryllia, or the like.

As illustrated in the accompanying figure, the top insulating component encloses and electrically insulates an electrically conductive coupling 20 from the anode 14. The coupling may be formed of niobium or other suitable material. The coupling connects the upper end 22 of the stem portion 24 of a fuel body 26, suspended within the envelope and spaced from the anode, to the lower end 28 of an electrically conductive support rod 30 fabricated of suitable metal, etc., such as copper, silver, etc. The fuel body provides the necessary heat for electron emission during operation of the nuclear reactor (not shown) within which the fuel element is to be disposed.

The fuel body 26 may comprise any suitable nuclear fuel material which is used as the heat source, for example, uranium oxide, uranium carbide, etc. The nuclear fuel material may, but need not, provide the electron emitter for the cathode 32 of the convertor. Thus, in the case where uranium dioxide is utilized as the nuclear fuel material, a jacket or sleeve (not shown) of an electron emitter, such as tantalum, etc., may be provided around the nuclear fuel. If, instead, uranium carbide or a uranium carbide-zirconium carbide mixture or other suitable carbide mixture is utilized as the nuclear fuel material, the carbon of the carbide acts as the electron emitter and no separate jacket of electron emitter is needed. Accordingly, in such instances, the fuel body 26 and the cathode 32 are identical.

As illustrated, the fuel body has preferably an expanded lower portion 34 to which the lower end 36 of the stem 24 is connected. The conductor support rod 30 holds the fuel body 26 in spaced relation from the envelope walls, and the rod 30, in turn, extends up into and is integrally connected to a cathode bus 38 formed of copper, graphite or other suitable electrically conductive material.

The anode is provided along its external surface with suitable cooling coils 40, as illustrated in the figure, which coils may be fabricated of stainless steel, or other suitable high temperature material. A portion of the anode is also connected on its external surface with an upwardly extending anode bus 42 spaced from the cladding and also from the cathode bus 38. The anode bus 42 may be fabricated of any suitable electrically conductive material, such as copper, silver, etc.

The thermionic convertor 6 is also provided at the bottom end thereof with two hollow reservoirs 44 and 46 communicating with the envelope. Both of the reservoirs extend down through openings in the bottom insulating component 18. Each reservoir may be fabricated of a suitable high temperature material, such as stainless steel, nickel, etc. The reservoir 44 is provided with a closed bottom end 48 and an open upper end 50 directly communicating with the interior of the sealed envelope 8. This reservoir contains a pool of material 52, such as an alkali metal, particularly, cesium metal, etc., which material is readily ionizable at low pressure and which provides in the ionized state a carrier gas capable of facilitating the transfer of electrons from the cathode 32 to the anode 14. Other metals besides cesium can be utilized for this purpose.

The reservoir 46 is essentially similar in construction to the reservoir 44, except that it is provided with means for controlling the passage of hydrogen gas therefrom and into the evacuated zone within the envelope 8. Specifically, across the upper end of reservoir 46, sealing it from direct communication with the envelope, is disposed a sheet 54 of material which is at high temperature permeable only to the anode work function-reducing gas, hydrogen, but which is essentially impermeable to the readily ionizable material 52 at temperatures up to and including the operating temperature of the convertor 6. Such sheet may comprise a suitable metal, such as, palladium, tantalum, etc., which when suitably heated becomes increasingly permeable to hydrogen.

The second reservoir 46 has a closed bottom end 56 and contains a hydrogen-releasing material 58, such as zirconium hydride, uranium hydride, calcium hydride, etc., which releases hydrogen upon suitable heating. Surrounding the second reservoir is a thermostatically-controlled heating means 60, which regulates the temperature within the reservoir and, accordingly, regulates the rate of release of hydrogen from the material 58. The heating means 60 may comprise, as illustrated in the figure in the accompanying drawings, a plurality of heating coils 62 disposed along the outer surface of the reservoir 46 and connected to recording and controlling means (not shown). Heating means 64, as illustrated, may also be provided for separately heating the barrier sheet 54 in a controlled manner to regulate the permeability thereof to hydrogen. Accordingly, the reservoir 46 and associated heating and control equipment provide means whereby hydrogen can be supplied through the barrier sheet 54 at high temperature under controlled conditions in a given concentration to the zone within the envelope 8 to provide the desired reduction in the anode work function, thereby increasing the efficiency and electrical output of the convertor.

During operation of the thermionic convertor 6, with the tube 12 disposed within a reactor core in place of a fuel element, the fuel body, by reason of the fissioning process, increases in temperature to a point where electron emission occurs from the emitter of the cathode in contact with or forming part of the nuclear fuel material.

The cesium metal or other readily ionizable material in the reservoir 44, by reason of the very low pressure, for example $10^{-5}$ mm. Hg, and high temperature of the thermionic convertor, preferable between about 1000° C. and 2000° C. at the cathode, vaporizes and passes from the reservoir 44 into the space between the cathode and anode within the envelope 8. Vaporized cesium is usually present at the operating temperature of the convertor in a concentration of only from about $10^{-6}$ mm. Hg to about 1 mm. Hg, depending upon the pressure and temperature within the envelope, and, as indicated, has the effect of increasing the rate at which the electrons boil off of the hot electrode (cathode) surface and also of reducing the energy lost in the cold electrode (anode). It forms the ionized gas or plasma which neutralizes the space charge in the region between the hot electrode and cold electrode, thereby facilitating the transfer of electrons from the hot electrode to the cold electrode.

Also during operation of the thermionic convertor, hydrogen gas is introduced in a suitable concentration into the same space within the envelope from the reservoir 46 through the barrier sheet 54. In this connection, the hydrogen-releasing material 58 within the reservoir 46 is subjected, by means of the electrostatically-controlled heating coils 62 surrounding the reservoir, to a controlled temperature increase. Thus, the uranium hydride, zirconium hydride, calcium hydride, or the like similar hydride, comprising the hydrogen-releasing material, is heated sufficiently to release a controlled concentration of hydrogen gas within the reservoir which migrates to the metallic barrier sheet of tantalum, palladium, etc.

Simultaneously, the heating means 64, if present, are operated to heat the barrier sheet to incandescence and to a controlled temperature to allow the free passage of hydrogen molecules through the crystal lattice structure of the barrier and into the envelope. Accordingly, the concentration of hydrogen within the envelope and within the reservoir 46 above the solid hydride becomes equalized. It will be understood that, if desired, means 64 may be dispensed with, and the overall operating temperature of the convertor can be relied upon to heat the barrier sheet sufficiently to make it permeable to hydrogen molecules. Heating control of the hydrogen-releasing material can be relied upon to determine the hydrogen gas concentration within the reservoir 46 and within the envelope 8.

It will be understood that, for the purposes of the present invention, means of controlling the hydrogen pressure in the reservoir other than those described can be resorted to. However, it has been found that one of the simplest means of controlling the hydrogen concentration is to provide the hydrogen in the form of a hydride, as described in connection with the single figure of the drawings, and then control the temperature of the hydride within the reservoir so as to control the concentration or pressure of hydrogen above the hydride and, therefore, the concentration of hydrogen within the envelope beyond the barrier.

Inasmuch as the barrier sheet is opaque to the passage therethrough of larger molecules than hydrogen, i.e., cesium atoms, loss of cesium metal or vapor from the envelope during operation of the thermionic convertor and into the reservoir 46 does not occur.

The exact mechanism whereby the hydrogen in contact with the anode work surface lowers the anode work function and, therefore, increases the efficiency of the convertor is not known. However, the results are reproducible. Under the same conditions, a convertor operated without any hydrogen present has a substantially lower efficiency and higher anode work function.

It is known that as the hydrogen is introduced into the envelope, it mixes with the cesium to form a compound, cesium hydride, which is stable at room temperature but which, at the operating temperature of the thermionic convertor, volatilizes into a molecular gas. The cesium hydride molecules thus vaporized partially dissociate, forming free hydrogen and cesium vapor. Accordingly, in contact with the anode surface during operation of the convertor are free hydrogen, cesium vapor and cesium hydride, the proportions thereof depending upon the initial concentrations of cesium and hydrogen present, and the operating conditions of the thermionic convertor. If only fixed amounts of cesium and hydrogen were introduced into the thermionic convertor envelope, i.e., if the continuous hydrogen concentration control were dispensed with, then the relative amounts of the indicated constituents in the vapor state and condensed or absorbed by the anode would be essentially uncontrollable and any change in convertor conditions, i.e., a change in temperature, would result in an uncontrollable change in the balance between cesium hydride molecules and cesium and hydrogen. However, in accordance with the present invention, absolute control of the hydrogen concentration within the envelope and, hence, the other constituents within the envelope, is maintained regardless of the temperature within the envelope, by the described means illustrated in the accompanying figure.

Since the cesium molecules are too large to pass through the incandescent barrier, i.e., the tantalum or palladium sheet, etc., disposed at the top of the second reservoir 46, the pressure of the cesium within the envelope is determined by cell temperature. The hydrogen pressure, inasmuch as the hydrogen passes through the barrier, is the same on both sides of the barrier (within the envelope and within the reservoir 46) and can be controlled, as previously indicated by controlling its pressure in the second reservoir.

It will be understood that, if the anode work function is reduced to below a point whereby the anode back current is allowed to become an appreciable factor, even though the anode work function will be very low the efficiency of the convertor will also be low due to the neutralization or substantial neutralization of the cathode current by the anode back current. It is preferred to regulate the hydrogen concentration within the envelope of the thermionic convertor so as to provide a back anode current which is no greater than about 10 percent of the cathode current.

It has been found that the cathode current of a useful thermionic convertor is about 1 ampere per square centimeter or larger of cathode surface. From a table of work functions, it can be determined that an anode surface of 1 volt work function operated at 300° C. will emit approximately 0.1 ampere per square centimeter. Thus, a 1 volt work function for the anode surface is both useful and desirable. If the anode work function is reduced, by introduction of hydrogen, as described, to the indicated lower limit of 1 volt, then the upper limit to the generator efficiency becomes the following:

$$\text{Convertor efficiency} = \frac{\text{voltage output}}{\text{maximum potential level}}$$

Assuming the usual maximum potential level of the electrons to be 3.3 volts which comprises the voltage output or load voltage plus the unusable portion of the input, that is, the anode work function, which is one volt, the load voltage is 2.3 volts. Thermionic convertor efficiency is, as indicated, the output voltage or voltage over the total voltage, that is 2.3 volts over 3.3 volts or 70 percent. The thermionic convertor of the present invention can be controlled to provide the indicated 1 volt work function of the anode, with the consequent increase in convertor efficiency. This is a substantial improvement over the previously indicated conventional convertor efficiency of about 45%.

It will be further understood that hydrogen concentrations which result in back currents of 5 to 15 percent of that of the cathode current can be satisfactorily utilized. The particular hydrogen concentration at a given operating temperature to produce the maximum efficiency in the convertor can be readily determined.

Accordingly, improved thermionic convertors utilizing external and/or internal heat sources can be fabricated in accordance with the present invention. Such convertors have improved efficiency of operation and increased voltage outputs. Such voltage outputs can be increased by controlling the hydrogen concentration within the convertor envelope, thereby controlling the value of the anode work function. The convertors include means whereby the hydrogen concentration within such envelope can be carefully regulated in a simple and efficient manner. The convertors are durable and adaptable to various operating conditions. Other advantages of the present invention are set forth in the foregoing.

Various of the features of the present invention are set forth in the appended claims.

What is claimed is:

1. An improved high temperature-low pressure thermionic converter which comprises, in combination, a cathode adapted to emit electrons of high temperature, an anode spaced from said cathode and adapted to operate at a temperature lower than the operating temperature of said cathode, means electrically insulating said cathode and anode from one another, connector means attached to said cathode and anode whereby said anode and cathode may be externally connected, means providing an evacuated zone extending between said cathode and said anode, means connected to said zone containing a readily ionizable alkali metal adapted to provide carrier gas at low pressure in said zone, said carrier gas facilitating the transfer of electrons from said cathode to said anode, means connected to said zone containing a hydrogen gas-releasing material, a barrier interposed between said zone and said means containing said hydrogen gas-releasing material, said barrier being permeable to hydrogen at high temperature but impermeable to said carrier gas, said barrier controlling the rate and concentration of hydrogen introduced into said zone, whereby the anode work function and efficiency of said converter are controlled.

2. An improved high temperature-low pressure thermionic converter which comprises, in combination, a cathode adapted to emit electrons at high temperature, an anode spaced from said cathode and adapted to operate at a temperature lower than the operating temperature of said cathode, means electrically insulating said cathode and anode from one another, connector means attached to said cathode and anode, whereby said cathode and anode may be connected across an external load, an envelope providing an evacuated zone between said anode and said cathode, a reservoir connected to and in communication with said evacuated zone and containing alkali metal capable of being readily ionized at low pressure to provide carrier gas within said zone, said carrier gas facilitating the transfer of electrons from said cathode to said anode, a second reservoir connected to said zone and containing a hydrogen gas-releasing material, a barrier interposed between said zone and said second reservoir, said barrier being permeable at high temperature only to hydrogen, and means connected to said second reservoir and adapted to control the concentration of hydrogen within said second reservoir and to control the temperature of said barrier, whereby the concentration of hydrogen in said zone is controllable, said hydrogen being capable of reducing the work function of said anode during operation of said converter for improvement of the efficiency of said converter.

3. An improved high temperature-low pressure thermionic converter for use in an atomic reactor, which converter comprises, in combination, a gas-tight envelope providing an evacuated zone, a cathode disposed within and spaced from said envelope and adapted to operate at high temperature, said cathode including a fissionable fuel and an electron emitter, an anode spaced from said cathode and adapted to operate at a lower temperature than said cathode, means electrically insulating said anode and cathode from each other within said envelope, connector means attached to said cathode and anode whereby said cathode and anode may be connected across an external load, a first reservoir connected to and in communication with said zone and containing cesium metal capable of being ionized at low pressure to provide carrier gas within said zone, a second reservoir connected to said zone and containing a hydrogen-releasing hydride, and a metal barrier interposed between said zone and said second reservoir, said barrier being permeable at high temperature only to hydrogen, and means connected to said second reservoir and capable of controlling the rate and concentration of release of hydrogen from said hydride, said hydrogen being capable of reducing the work function of said anode, thereby increasing the efficiency of said convertor and the electrical output thereof.

4. An improved high temperature-low pressure thermionic converter for use in an atomic reactor, which converter comprises, in combination, a gas-tight evacuated envelope, a cathode disposed within and spaced from said envelope and adapted to operate at high temperature, said cathode including a fissionable fuel and an electron emitter, an anode spaced from said cathode and adapted to operate at a lower temperature than said cathode, means electrically insulating said anode and cathode from each other within said envelope, connector means attached to said cathode and anode whereby said cathode and anode may be connected external of said envelope across an external load, a first reservoir connected to and in direct communication with said gas-tight envelope and containing cesium metal capable of being ionized at low pressure to provide a carrier gas within said envelope, a second reservoir connected to said envelope and containing a hydrogen-releasing hydride, a palladium metal barrier interposed between said second reservoir and said envelope, said barrier being permeable at high temperature only to hydrogen, and temperature control means connected to said second reservoir and barrier, and capable of independently controlling the rate of release of hydrogen from said hydride and rate of transfer of said hydrogen from said second reservoir to said envelope, said hydrogen being capable of reducing the work function of said anode, thereby increasing the efficiency of said converter and the electrical output thereof.

5. A method for reducing the anode work function of a thermionic converter apparatus, which apparatus includes a cathode element adapted to operate at high temperature, an anode element spaced from said cathode element and adapted to operate at a temperature lower than the operating temperature of said cathode element and an ionizable gas disposed in an evacuated zone between said cathode and anode, which method comprises decomposing a metal hydride within a reservoir adjacent said zone to provide hydrogen gas, introducing said hydrogen gas formed into said zone through a barrier disposed between said zone and said reservoir that permits the passage of hydrogen therethrough at high temperature but does not permit passage of said ionizable gas, and controlling the rate of decomposition of said metal hydride so that the anode work function is reduced while at the same time the anode back current is maintained below about 15 percent of the cathode current.

6. An improved high temperature-low pressure conversion system which comprises, in combination, a first element adapted to operate at high temperature, a second element spaced from said first element and adapted to operate at a temperature lower than the operating temperature of said first element, means electrically insulating said first element and said second element from one another, connector means attached to said first element and said second element whereby said first and second elements may be externally connected, an evacuated zone between said first element and said second element containing a readily ionizable alkali metal adapted to provide carrier gas at low pressure in said zone, means connected to said zone containing hydrogen, a barrier interposed between said zone and said means, said barrier being permeable to hydrogen at high temperature but impermeable to said carrier gas, said barrier controlling the rate and concentration of hydrogen introduced into said zone, whereby the anode work function and efficiency of said converter are controlled.

7. An improved high temperature-low pressure conversion system which comprises, in combination, a first element adapted to operate at high temperature, a second element spaced from said first element and adapted to operate at a temperature lower than the operating temperature of said first element, means electrically insulating said first element and said second element from one another, connector means attached to said first element and said second element whereby said first and second elements may be externally connected, an evacuated zone between said first element and said second element containing a readily ionizable alkali metal adapted to provide carrier gas at low pressure in said zone, means connected to said zone containing hydrogen, a barrier interposed between said zone and said means, said barrier being permeable to hydrogen at high temperature and impermeable to hydrogen at low temperatures and impermeable to said carrier gas at all temperatures, and control means for controlling the temperature of said barrier to regulate the pressure of hydrogen gas in said evacuated zone between said cathode and anode during operation of said converter, whereby the anode work function of said converter is controlled to improve the efficiency of said converter.

8. A method for reducing the anode work function of a thermionic converter apparatus, which apparatus includes a cathode element adapted to operate at high temperature, an anode element spaced from said cathode element and adapted to operate at a temperature lower than the operating temperature of said cathode element and an ionizable gas disposed in an evacuated zone between said cathode and anode, which method comprises introducing hydrogen gas into said zone from a reservoir adjacent said zone through a barrier disposed between said zone and said reservoir, said barrier permitting the passage of hydrogen therethrough at high temperature but not permitting passage of said ionizable gas therethrough, and controlling the passage of hydrogen through said barrier so that the anode work function of the converter is reduced while at the same time the anode back current is maintained below about 15 percent of the cathode current.

References Cited by the Examiner

UNITED STATES PATENTS

| 2,980,819 | 4/61 | Feaster | 310—4 |
| 3,002,116 | 9/61 | Fisher | 310—4 |

FOREIGN PATENTS

| 232,855 | 2/61 | Australia. |
| 797,872 | 7/58 | Great Britain. |
| 854,036 | 11/60 | Great Britain. |

OTHER REFERENCES

July 1959, Nucleonics, pp. 51–55.

Direct Conversion of Heat to Electricity by J. Kaye et al., John Wiley & Sons, N.Y., 1960, pp. 9–1 to 9–11.

CARL D. QUARFORTH, *Primary Examiner.*

REUBEN EPSTEIN, *Examiner.*